United States Patent
Dennis et al.

(10) Patent No.: US 10,817,966 B2
(45) Date of Patent: Oct. 27, 2020

(54) EXPANDED DATA PROCESSING FOR ENTITY MATCHING

(71) Applicant: Experian Health, Inc., Franklin, TN (US)

(72) Inventors: John Dennis, Marietta, GA (US); Sean Daniel Reisz, Tucker, GA (US); Karly Rowe, Scottsdale, AZ (US); Matthew McCawley, Marietta, GA (US); Dimuthu A. Wijetilleke, Atlanta, GA (US)

(73) Assignee: EXPERIAN HEALTH, INC., Franklin, TN (US)

( * ) Notice: Subject to any disclaimer, the term of this patent is extended or adjusted under 35 U.S.C. 154(b) by 352 days.

(21) Appl. No.: 15/474,918

(22) Filed: Mar. 30, 2017

(65) Prior Publication Data

US 2018/0285363 A1 Oct. 4, 2018

(51) Int. Cl.
*G06F 16/00* (2019.01)
*G06Q 50/26* (2012.01)
*G06F 16/215* (2019.01)

(52) U.S. Cl.
CPC ........... *G06Q 50/26* (2013.01); *G06F 16/215* (2019.01)

(58) Field of Classification Search
CPC .................................................. G06F 16/215
USPC ........................................................ 707/728
See application file for complete search history.

(56) References Cited

U.S. PATENT DOCUMENTS

| | | | |
|---|---|---|---|
| 8,438,184 B1* | 5/2013 | Wang | H04L 67/306 707/780 |
| 8,583,684 B1* | 11/2013 | Kirmse | G06F 16/29 707/770 |
| 9,002,883 B1* | 4/2015 | Kirmse | G06F 16/29 707/770 |
| 9,589,058 B2* | 3/2017 | Balduzzi | G06Q 50/10 |
| 2006/0026156 A1* | 2/2006 | Zuleba | G06F 21/6227 |
| 2008/0244008 A1* | 10/2008 | Wilkinson | H04L 67/1065 709/205 |
| 2008/0270363 A1* | 10/2008 | Hunt | G06F 16/2462 |
| 2009/0024623 A1* | 1/2009 | Broder | G06F 16/951 |
| 2009/0106242 A1* | 4/2009 | McGrew | G06F 16/258 |
| 2010/0049695 A2* | 2/2010 | Morsa | G06Q 30/02 |
| 2011/0106617 A1* | 5/2011 | Cooper | G06Q 30/0241 705/14.49 |

(Continued)

*Primary Examiner* — Hanh B Thai
(74) *Attorney, Agent, or Firm* — Merchant & Gould

(57) ABSTRACT

Expanded data processing for entity matching is provided. A request for determining a matching entity is received. The received request is parsed to determine demographic field data associated with the request. A first look up operation is performed in an indexed demographic data for a first demographic field associated with the request. A first list of entities matching with the first demographic field data is received in response to the first look up operation. A second look up operation is performed in the indexed demographic data to determine a set of demographic attributes associated with each entity on the first list. The demographic attributes correspond to a second demographic field associated with the request. A matching confidence for whether the entity is associated with a given entity in the first list is determined based on a comparison between the demographic field data and the demographic attributes.

19 Claims, 5 Drawing Sheets

(56) References Cited

U.S. PATENT DOCUMENTS

| | | | |
|---|---|---|---|
| 2012/0215768 A1* | 8/2012 | Zellweger | G06F 16/2423 707/722 |
| 2013/0054274 A1* | 2/2013 | Katyal | G06Q 40/08 705/4 |
| 2014/0039929 A1* | 2/2014 | Vdovjak | G16H 10/60 705/3 |
| 2014/0236572 A1* | 8/2014 | Meshulam | G06F 16/3329 704/9 |
| 2014/0379374 A1* | 12/2014 | Vinals | G16H 10/60 705/3 |
| 2015/0262246 A1* | 9/2015 | Stack | G06Q 10/10 705/51 |
| 2015/0286747 A1* | 10/2015 | Anastasakos | G06F 16/9017 707/776 |
| 2015/0356142 A1* | 12/2015 | Proux | G06F 16/3334 706/11 |
| 2016/0037197 A1* | 2/2016 | Kitts | H04N 21/25883 725/35 |
| 2016/0055142 A1* | 2/2016 | Strassner | G06Q 30/0201 707/755 |
| 2016/0132605 A1* | 5/2016 | Jiang | H04L 67/16 707/728 |
| 2016/0267115 A1* | 9/2016 | Pletcher | G06F 16/22 |
| 2017/0169168 A1* | 6/2017 | Batchelor | G16H 10/60 |

* cited by examiner

EXPANDED DATA PROCESSING FOR ENTITY MATCHING

BACKGROUND

Several industries use various entity matching technologies to uniquely identify entities. However, when a person moves or changes a last name (e.g., due to marriage or divorce), for example, it becomes challenging to link those two "people" together and confirm that they are one person. In previous systems, social security numbers or other governmental identification numbers have helped in creating confidence in whether two entities with different demographic data are, in fact, one entity, but these identifiers are not always reliable, and the availability of some identifiers in records, such as, social security numbers, has decreased due to security and privacy concerns. Additionally, data entry errors add to the challenge, as the entered identifiers may include typographical errors and therefore cannot be relied upon.

SUMMARY

Aspects of methods and systems for determining a matching entity are provided herein. A request for determining a matching entity is received. The received request is parsed to determine demographic fields and data associated with the demographic data fields of the request. A first look up operation is performed in an index for a first demographic field data. A first list of entities matching with the first demographic field data is received in response to the first look up operation. A second look up operation is performed in the index to determine a set of demographic attributes associated with each entity on the first list of entities. A demographic attribute associated with a second demographic field of the request is selected from the set of attributes. A third look up operation is performed to determine a second list of entities associated with the selected attribute. The second list is incorporated into the first list to create a candidate list of entities. An entity matching with the demographic field data of the request is determined from the candidate list based on a comparison between the demographic field data and the demographic attributes.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

Further features, aspects, and advantages of the invention represented by the examples described in the present disclosure will become better understood by reference to the following detailed description, appended claims, and accompanying Figures, wherein elements are not to scale so as to more clearly show the details, wherein like reference numbers indicate like elements throughout the several views, and wherein:

DETAILED DESCRIPTION

Aspects of methods and systems for entity matching are provided herein. In response to receiving a request for an identifier for an entity, the received request is parsed to identify various demographic fields and data associated with each of the demographic fields within the request. A demographic field data is then selected to find a first list of entities matching with the demographic field data from an index or a database. Based on the search the first list of candidate entities is obtained. The index or the database is searched again to determine demographic attributes associated with each entity on the first list. An attribute from the demographic attributes is then selected to perform another search. A second list of entities is obtained based on the subsequent search. The second list of entities includes one or more entities associated with the selected attribute. The entities from the second list are added to the first list to create a candidate list or candidate records.

A probabilistic search is then performed to compare demographic field data from the request to the candidate records. A score is attached to each comparison. A unique identifier associated to an entity with the highest probabilistic score is returned to the requestor. If no records match demographic field data from the request, a new unique identifier is created and assigned to the entity. The identifier then is entered into the index and returned to the requestor.

In one aspect, the methods and systems disclosed herein, by not requiring data for each and every demographic field for record matching, may mitigate requirements of one or more demographic fields on records. For example, the methods and systems disclosed herein may mitigate requirements of social security number on the records, thereby mitigating risks associated with protecting such information. In another aspect, the methods and systems disclosed herein may mitigate risks associated with fraudulent demographic data used in one or more records. For example, the method and systems described herein may corroborate demographic field data of one record with the demographic field data provided on another record by a same entity. In yet another aspect, the methods and systems disclosed herein may mitigate risks associated with wrongful entry of demographic data used in a record. For example, the method and systems described herein may verify the demographic field data on one record with the demographic field data provided on another record associated with a same entity.

Figure 1:
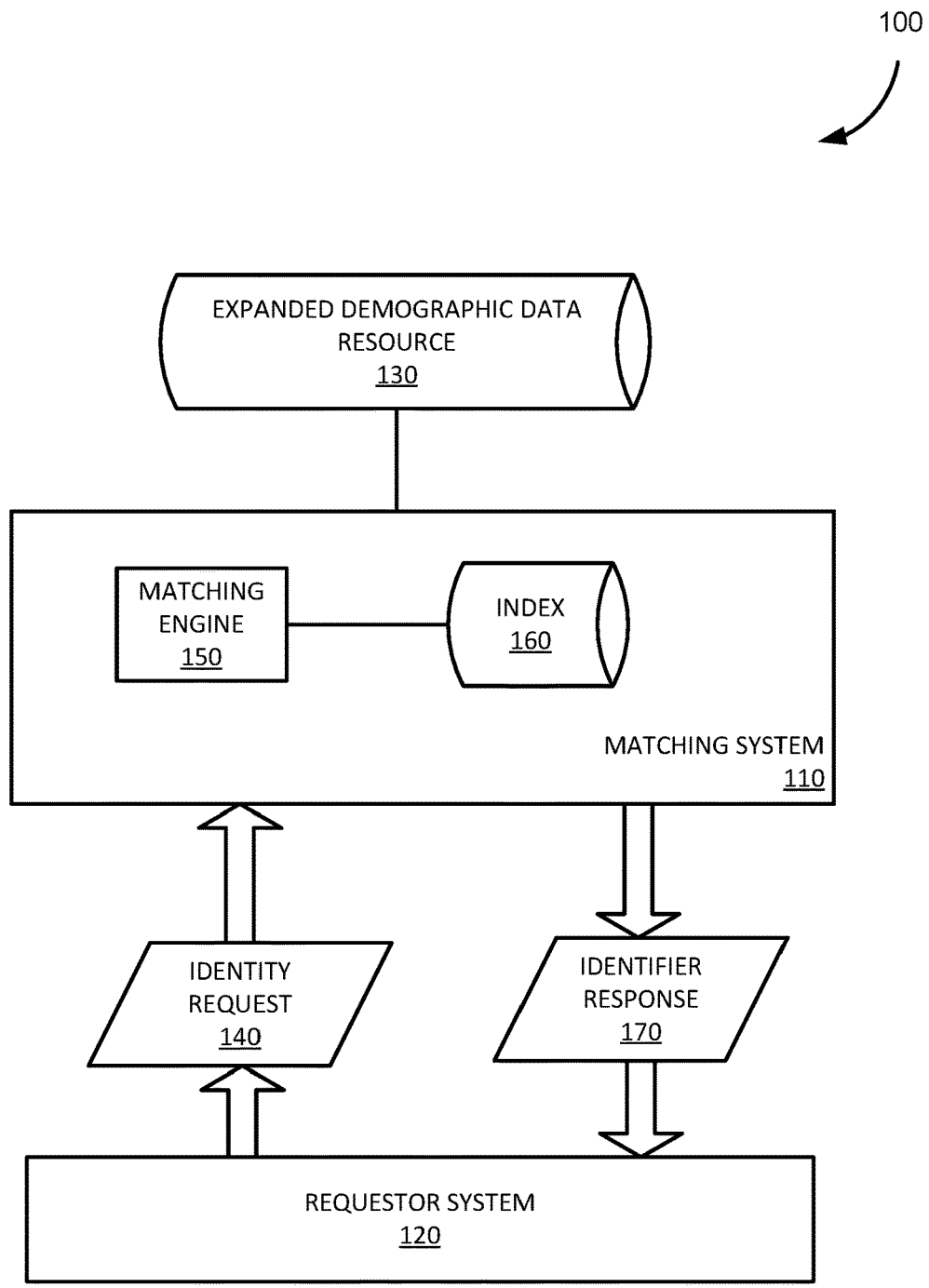
FIG. 1 illustrates an example operating environment in which entity matching may be performed.

FIG. 1 illustrates an example operating environment 100 in which expanded data processing for improved entity matching may be performed. As illustrated in FIG. 1, example operating environment 100 includes a matching system 110, a requester system 120, and an expanded demographic data resource 130. Matching system 110 communicates with requester system 120 and expanded demographic data resource 130 to provide a requesting entity that has sent an identity request for an entity with a unique identifier for that entity with improved accuracy and reliability in the matching process. Matching system 110 includes a matching engine 150 and an index 160. Index 160 may include the index of expanded demographic data resource 130. Requester systems 120 may be remote or local to the computing environment in which matching system 110 is operated. Matching system 110, requester system 120, and expanded demographic data resource 130 are operable to communicate with each other over one or more communications links, such as, the Internet, local area networks, wireless networks, wired networks, etc.

Figure 5:
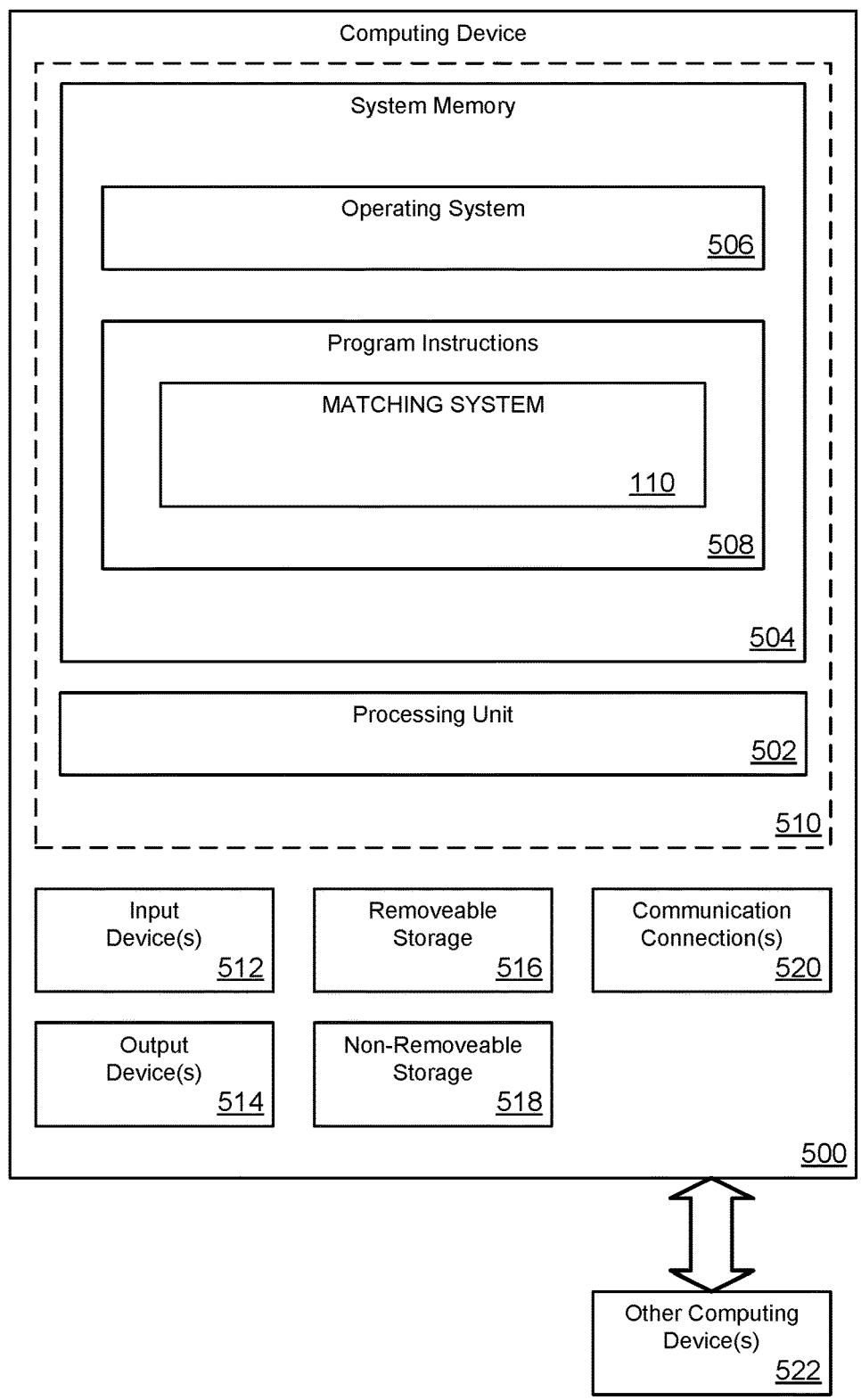
FIG. 5 is a block diagram illustrating example physical components of a computing device with which aspects of disclosure may be practiced.

Matching system 110, requester system 120, and expanded demographic data resources 130 are illustrative of a wide variety of computing devices, the hardware of which is discussed in greater detail in regard to FIG. 5. The computing device may include, but are not limited to: servers, desktop computers, laptops computers, tablets, smart phones, personal digital assistants, and distributed systems that are run on multiple computing devices. In various aspects, matching system 110, requester system 120, and expanded demographic data resources 130 may communicate with one another via the Internet, a private network, or a virtual private network or tunnel over a public network, which may include wired and wireless components to link systems that are located remotely from each other.

Figure 2:
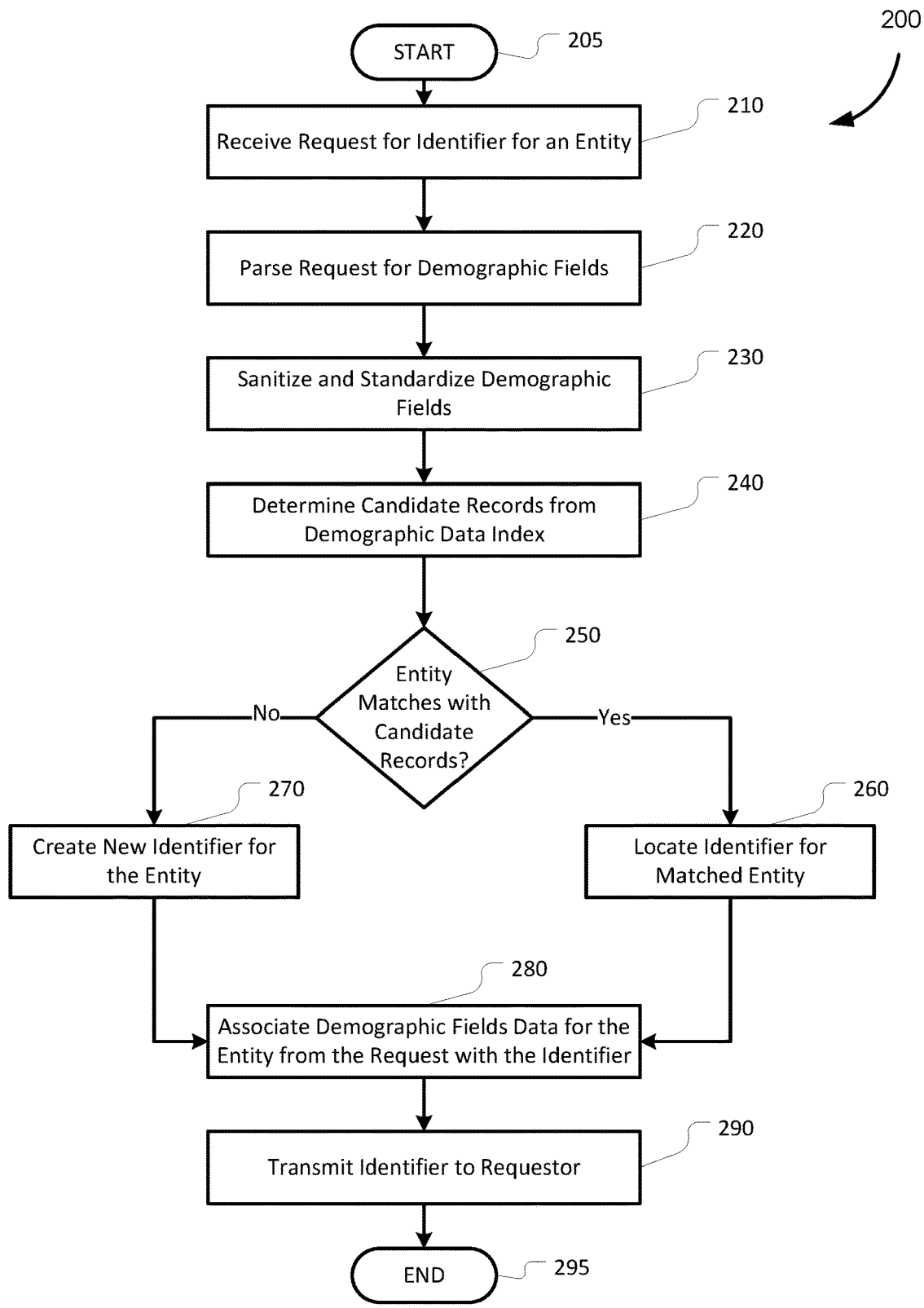
FIG. 2 is a flow chart showing general stages involved in an example method for the entity matching.

FIG. 2 is a flow chart showing general stages involved in an example method 200 for the matching system. Method 200 begins at START OPERATION 205 and proceeds to OPERATION 210, where a request for an identifier associated with an entity is received. For example, a request may be received to determine a social security number associated with a medical record with missing or incomplete social security number. In another example, a request may be received to determine a previous last name for a record. In one aspect, the request may be in form of a record, such as a medical test results, a financial statement, a utility bill, etc. For example, a request may be received to determine a previous name and social security number associated with a record listing a current name "JOHN DENNIS."

In one aspect, the request for the identifier is generated as an identity request 140. For example, requester system 120 is operable to generate identity requests 140. Matching system 110 is operable to receive identity requests 140 from requester systems 120. Identity requests 140 may include several fields of demographic data, which may include more or fewer fields than are present in the demographic data sources available to matching system 110 or may be unreliable (e.g., due to human entry errors). For example, a requester who may submit identity request 140 may not include a demographic field for an entity's address, whereas matching system 110 may maintain or has access to demographic data related to the entity's address. Similarly, a requester may include a demographic field in identity request 140 (e.g., height, weight, eye color, schools attended, customer number) for which matching system 110 does not maintain or have access to. In addition, a requester may include a demographic field in identity request 140 for which there is no corresponding data in the identity request 140. Similarly, a requester may include a demographic field in identity request 140 for which there is only partial data or incorrect data in the identity request 140.

After receiving the request at OPERATION 210, method 200 proceeds to OPERATION 220, where the received request is parsed. The received request is parsed to determine one or more demographic fields associated with the request and data associated with those demographic fields. For example, and as stated previously, a request may include a plurality of demographic fields, such as, a first name field, a middle name field, an address field, a date of birth field, a social security number field, etc. Each of these demographic fields may include corresponding demographic field data. Corresponding demographic field data may be parsed from the request as well. In one aspect, the corresponding demographic field data may be missing from the received request. In another aspect, the corresponding demographic field data may be partially complete or incorrectly entered. For example, in the previous request "JOHN DENNIS", the social security number on the record may be missing completely, may be truncated, or may be inaccurate. In one aspect, matching engine 150 is operable to parse the received request.

Once having parsed the request at OPERATION 220, method 200 proceeds to OPERATION 230, where the demographic field data is sanitized and standardized. In various aspects, sanitization of the demographic field may include deleting known-unreliable record fields. For example, if a value of a social security number for an entity is 000-00-0000, which is recognized as an invalid social security number, it is not considered to be part of the request or added to the entity's records; it is treated as blank or null. In another example, if a value of a first name for an entity is "baby girl", which is recognized as a placeholder value used by some medical facilities to refer to unnamed newborn girls, it may not be considered to be a part of the request and may not be added to the entity's records as a valid value for the first name field. In various aspects, standardization of the demographic field data may include formatting demographic fields to make it consistent with a data stored in the index 160. For example, if a value of the address field is "125 N Elm", it is changed to "125 ELM", wherein the "N" indicating North from the address field is deleted and the case of the street name is standardized to improve consistency between data fields received in different requests or data sources. In another example, the words or abbreviations for street, boulevard, avenue, etc., are removed from the address field since they may be entered in a plurality of ways which may increase inconsistency between records.

After sanitizing the demographic field data at OPERATION 230, method 200 proceeds to OPERATION 240, where candidate records are determined from a demographic data index. For example, demographic field data from the request is compared with demographic field data in an internal or an external demographic data resource to determine candidate records. In one aspect, one or more algorithms may be used for the comparison. An example method for determining candidate records from a demographic data Index is described in greater detail with respect to FIG. 3.

In one aspect, matching engine 150 is operable to perform the comparison to determine the candidate records from index 160 for the selected demographic field data. Index 160 includes index of records from expanded demographic data resource 130. For example, index 160 may include a list of unique identifiers associated with each record of expanded demographic data resource 130. In various aspects the expanded demographic data resource 130 is a computer system for a credit agency (e.g., providing credit header data for an entity's demographics), for a commercial entity (e.g., providing consumer shipping or loyalty program details for an entity's demographics), or for a governmental agency (e.g., providing official records for an entity's demographics). Although examples are given primarily in terms of human persons, it will be understood that entities include non-human persons (e.g., corporations, partnerships, agencies), animals, and inanimate objects (e.g., vehicles).

Once the candidate records are identified at OPERATION 240, method 200 proceeds to DECISION OPERATION 250, where candidate records matching with the demographic field data in the request are determined. For example, matching engine 150 is operable to determine whether one or more of those candidates provide enough data in their demographic fields—matched or unmatched to the data in identity request 140—for at least one candidate entity to satisfy a confidence threshold that the entity in identity request 140 is the same entity as in the demographic data stored in index 160 or received from expanded demographic data resource 130. An example method to determine which candidate records from the index 160 (if any) is identified as matching to the entity in the request is described in greater detail with respect to FIG. 4.

Various aspects allow for various confidences to be determined between two sets of records as to whether they refer to the same entity. For example, two systems that receive an identity request 140 with demographic data for "John" "Doe" "123 Main Street" "Born: 1-1-1950" may match the entity described in the identity request 140 to an entity for "Johnathan" "Doe" "122 Main Street" "Born: 1-1-1950" and "John" "Roe" "123 Main Street" "Born: 1-2-1950" respectively based on different weights assigned to different fields when comparing the demographic data.

If at DECISION OPERATION 250, a particular candidate record is identified as matching the entity in the request; method 200 proceeds to OPERATION 260, where a unique identifier associated with the matched record may be located. For example, the unique identifier is located by identifying a unique identifier field in the matching entity and locating the unique identifier from the unique identifier field. Matching engine 150 is operable to locate the identifier for the matched entity. If at DECISION OPERATION 250, no candidate record is identified as matching the entity in the request, method 200 proceeds to OPERATION 270, where a new unique identifier may be created for the entity and added to index 160. For example, matching engine 150 is operable to create a new identifier.

At OPERATION 280, the demographic field data associated with the entity from the request may be associated with the located or created identifier. For example, matching engine 150 is operable to associated with the entity from the request may be associated with the located or the created identifier. After associating the demographic field data at OPERATION 280, method 200 proceeds to OPERATION 290 where the identifier may be transmitted to the requestor at OPERATION 290.

The identifier that is returned for an existing entity in the index 160 or created for a new entity that is added to index 160 in response to identity request 140 is returned to requesting system 120 via an identifier response 170. In various aspects, identifier response 170 includes the unique identifier for the entity whose identifier was requested in the identity request 140, as well as other information to allow the requestor to correlate identifier response 170 to identity request 140 that initiated the entity matching. After transmitting the identifier at OPERATION 290, method 200 may conclude at END OPERATION 295.

In aspects where more than one entity satisfies the confidence threshold, the candidate entity with the highest confidence score is selected as the match. In aspects where no entity stored in index 160 matches the entity whose demographic data are provided in identity request 140, matching system 110 will create a new identifier for that entity. Some or all of the data from identity request 140 and expanded demographic data used to augment the data stored in index 160 for the entity (if the entity was previously stored in index 160) are associated the identifier in index 160 for later matching attempts. When the indexed data are augmented with the expanded demographic data, the demographic data fields for a given entity are expanded to include prior values for those fields that have been noted by the third party who supplied the expanded demographic data. For example, when an expanded demographic data source has data for other names or aliases, addresses, national identification numbers, etc., that have been used by an entity, those other data are used in addition to the indexed data for the entity. The expanded data include historical data (e.g., a maiden name), data that has been updated more recently that what has been seen by matching system 110 (e.g., a married name when the maiden name is indexed), misspellings/misentries of data fields that have been submitted to expanded demographic data resource 130, and other variations to field data that occur over time for an entity.

Figure 3:
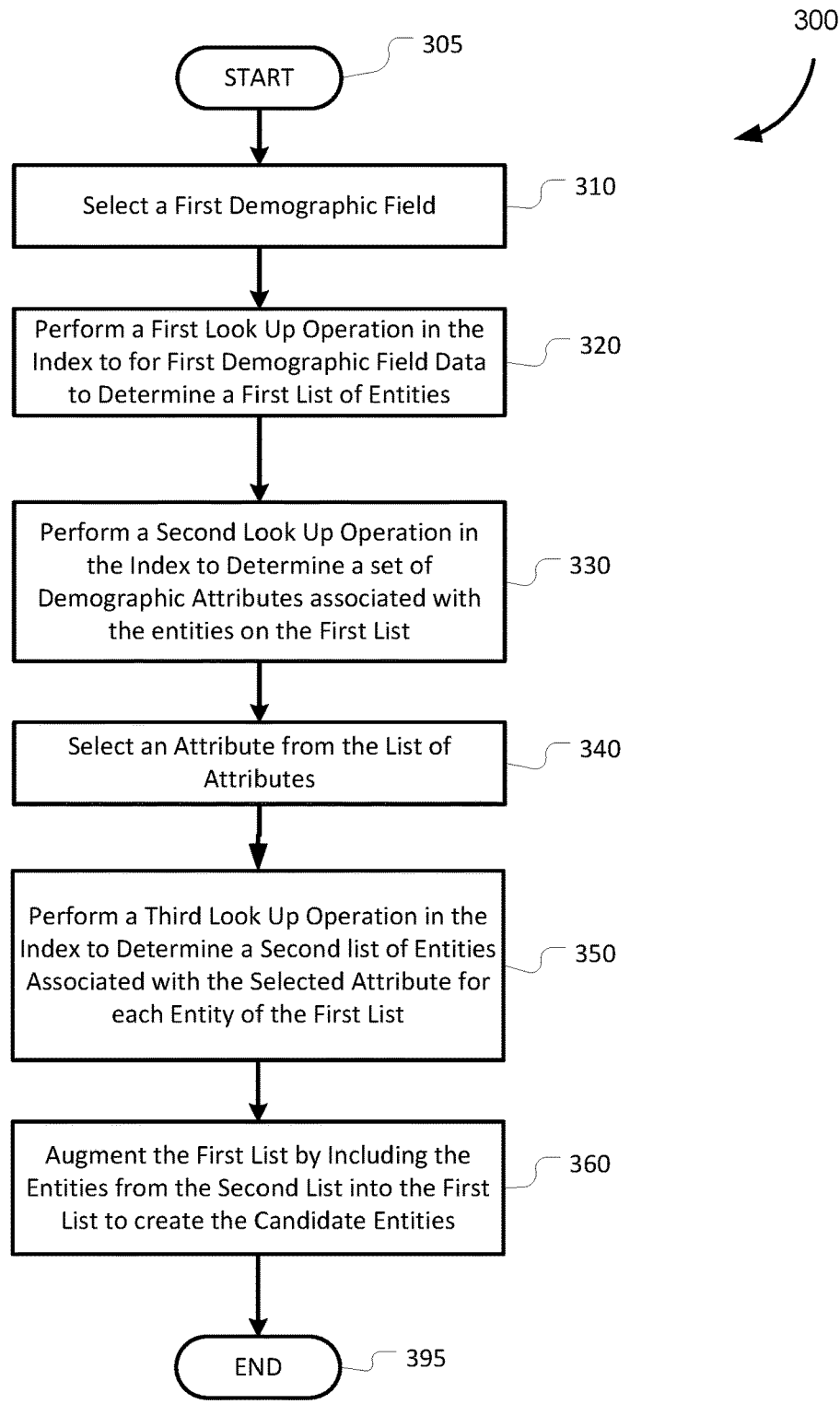
FIG. 3 is a flow chart showing in further depth the general stages involved in the example method for determining a candidate list for the entity matching.

FIG. 3 is a flow chart showing general stages involved in a method 300 for determining candidate records from a demographic database or an index, such as index 160. Method 300 begins at START OPERATION 305 and proceeds to OPERATION 310, where a first demographic field is selected. For example, a first name, for example "JOHN", from the parsed demographic fields of the request may be selected. In one aspect, matching engine 150 is operable to select the first demographic field data. In another aspect, the first demographic field data is selected by a user.

After selecting the first demographic field at OPERATION 310, method 300 proceeds to OPERATION 320, where a first lookup operation is performed in index 160 for the selected first demographic field data. The first looking operation is performed to determine a first list of entities which match with the selected first demographic field data. For example, the first list of entities may include a list of records having "JOHN" as the first name. In one aspect, matching engine 150 is operable to perform the first look up operation.

After determining the first list at OPERATION 320, method 300 proceeds to OPERATION 330, where a second look up operation is performed to determine a set of demographic attributes associated with each entity on the first list. For example, a current address and all previous address associated with each "JOHN" on the first list are determined. In another example, all last names associated with each "JOHN" on the first list are determined. In one aspect, the set of demographic attributes may include address, last name, date of birth, a social security number, a bank account number, etc. In another aspect, matching engine 150 is operable to perform the second look up operation to determine the set of demographic attributes from index 160.

After determining the set of attributes at OPERATION 330, method 300 proceeds to OPERATION 340, where an attribute from the list of determined attributes is selected. The selected attribute may correspond to a second demographic field in the received request. For example, where the selected attribute may correspond to an address associated with the request. In one aspect, matching engine 150 is operable to select the attribute. In another aspect, the attribute is selected by a user.

After determining the second demographic field at OPERATION 340, method 300 proceeds to OPERATION 350, where a third look up operation is performed to determine a second list of entities associated with the selected attribute for each entity on the first list. For example, the third look up operation may be performed to determine all previous entities associated with each addresses associated with each "JOHN" on the first list. Hence, the third lookup operation may be performed to determine each person previously associated with each address of each "JOHN" on the first list. In one aspect, matching engine 150 is operable to perform the third look up operation in index 160 to determine the second list of entities from index 160.

After determining the second list of entities at OPERATION 350, method 300 proceeds to OPERATION 360, where a candidate list or candidate records is/are created by augmenting the first list with the entities from the second list. For example, all entities on the second list are added to the first list to create the candidate list. In one aspect, matching engine 150 is operable to merge the two lists to create the candidate list. After creating the candidate list of entities at OPERATION 360, method 300 concludes at END OPERATION 395.

Figure 4:
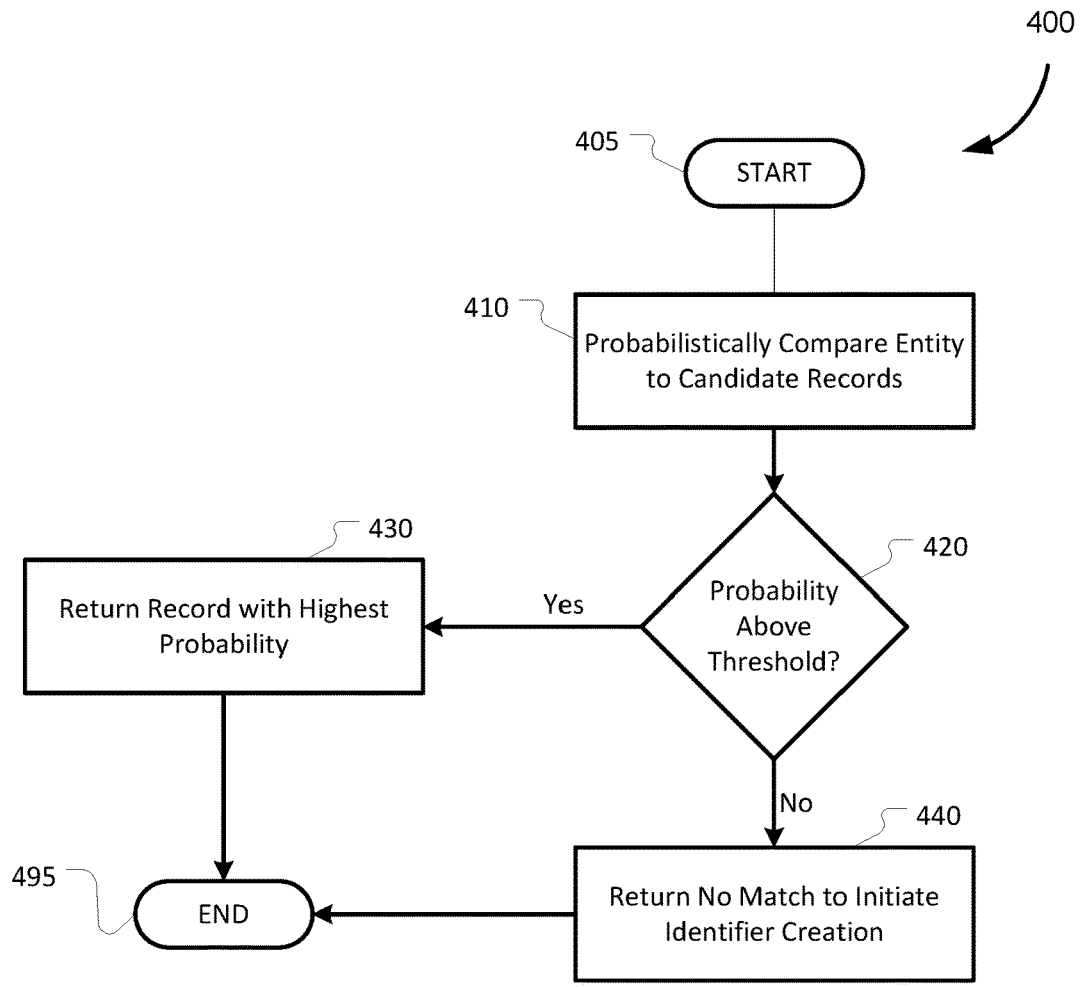
FIG. 4 is a flow chart showing general stages involved in an example method for determining an unique identifier based on the entity matching.

FIG. 4 is a flow chart showing general stages involved in a method 400 for determining a unique identifier associated with a matching entity. Method 400 begins at START OPERATION 405 and proceeds to OPERATION 410, where a set of candidate records identified at OPERATION 240 are probabilistically compared with an entity in the request. For example, each demographic field data associated with the request may be compared with corresponding demographic field data of each entity on the candidate records. In one aspect, matching engine 150 is operable to probabilistically compare the two demographic field data.

In one aspect a score is associated with each candidate record based on its matching probability. For example, if the date of birth, social security number and first and last name are matched successfully with a candidate record, it will have a higher matching score compared to a candidate record where date of birth and last name were matched, but the social security number and first name were not matched. As will be appreciated, different aspects may apply different weights to exact matches, near-misses, and large-misses in matching various demographic data fields. In various aspects, near-misses are inexact matches that include character differences that fall below a threshold (e.g., no more than n characters different between two fields) to account for typographical, spelling, transposition, and transcription informalities. For example "Msry" or "Mray" may be considered near-misses for "Mary" according to a character difference threshold for one informality (typographical and transposition, respectively), whereas "John" or "Msrt" would be considered a large-misses in the current example.

At DECISION OPERATION 420, a determination is made as to whether the score satisfies a pre-determined threshold value to identify records that the system is confident refer to the same entity. If multiple entities are discovered with scores satisfying the threshold, the entity whose candidate score is the highest is returned at SUB-OPERATION 430. For example, a match with a lower difference in non-matching demographic fields (e.g., a typo in a name) may be given a high score relative to a match with major differences in non-matching demographic fields (e.g., a different name).

If at DECISION OPERATION 420 it is determined that no candidate entity has a confidence score satisfying the predetermined threshold, OPERATION 250 proceeds to SUB-OPERATION 440 and returns that no matching entity was found in the index 160, which initiates the creation of a new identifier for that unmatched entity. Method 400 may conclude at END OPERATION 495.

FIG. 5 is a block diagram illustrating physical components of an example computing device with which aspects may be practiced. The computing device 500 includes at least one processing unit 502 and a system memory 504. System memory 504 may comprise, but is not limited to, volatile (e.g. random access memory (RAM)), non-volatile (e.g. read-only memory (ROM)), flash memory, or any combination thereof. System memory 504 includes operating system 506, one or more program instructions 508, and sufficient computer-executable instructions for a matching system 110, which when executed, perform functionalities such as methods 200, 300, and 400 as described herein. Operating system 506, for example, may be suitable for controlling the operation of computing device 500. Furthermore, aspects may be practiced in conjunction with a graphics library, other operating systems, or any other application program and is not limited to any particular application or system. This basic configuration is illustrated by those components within a dashed line 510. Computing device 500 also includes one or more input device(s) 512 (keyboard, mouse, pen, touch input device, etc.) and one or more output device(s) 514 (e.g., display, speakers, a printer, etc.).

The computing device 500 may further include additional data storage devices (removable or non-removable) such as, for example, magnetic disks, optical disks, or tape. Such additional storage is illustrated by a removable storage 516 and a non-removable storage 518. Computing device 500 also contains a communication connection 520 that allows computing device 500 to communicate with other computing devices 522, such as over a network in a distributed computing environment, for example, an intranet or the Internet. Communication connection 520 is one example of a communication medium, via which computer-readable transmission media (i.e., signals) may be propagated.

Programming modules, may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media do not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 500 or any other computing devices 522, in combination with computing device 500, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A method for determining a matching entity, comprising:
   receiving, at an entity matching system, a request for a unique identifier of an entity associated with a medical record that includes a missing or an incomplete social security number;
   providing indexed expanded demographic data that includes indexed credit header data of a credit agency that augments demographic information;
   parsing the request to determine demographic fields and demographic field data related to the entity;
   performing a first look up operation in the indexed expanded demographic data for data of a first demographic field associated with the request;
   receiving, in response to the first look up operation, a first list of entities matching the first demographic field data;
   performing a second look up operation in the indexed expanded demographic data to determine a set of demographic attributes associated with each entity on the first list of entities, wherein the demographic attributes correspond to at least one other demographic field parsed from the request;
   determining, based on a comparison between the demographic field data parsed from the request and the demographic attributes resulting from the second look up operation, a matching confidence for whether the entity corresponds to a given entity in the first list of entities; and
   outputting the unique identifier when the matching confidence exceeds a confidence threshold.

2. The method of claim 1, further comprising:
   performing a third look up operation in the indexed expanded demographic data to determine a second list of entities, wherein the second list of entities are associated with a demographic attribute of the set of demographic attributes associated with the first list of entities; and
   augmenting the first list of entities by incorporating the second list of entities and the set of demographic attributes associated with each entity of the second list of entities.

3. The method of claim 1, further comprising mitigating a loss of third demographic field data of the demographic field data.

4. The method of claim 3, wherein mitigating the loss of the third demographic field data comprises mitigating the loss of a social security number associated with the entity.

5. The method of claim 1, further comprising:
   selecting, in response to the matching confidence satisfying the confidence threshold, a prior-assigned identifier that is associated with the given entity as the unique identifier for the entity; and
   transmitting the unique identifier to the requestor.

6. The method of claim 1, further comprising creating, in response to the matching confidence not satisfying the confidence threshold, a new identifier as the unique identifier for the entity.

7. The method of claim 1, further comprising:
   sanitizing, prior to performing the first look up operation, the demographics field data to remove data fields whose values correspond to known invalid values.

8. The method of claim 1, further comprising:
standardizing, prior to performing the first look up operation, the demographics field data to a format used by the indexed expanded demographic data.

9. The method of claim 1, wherein determining the matching confidence comprising determining the matching confidence using a probabilistic and referential matching.

10. The method of claim 1, wherein the first demographic field data is at least one of a first name, a middle name, a middle initial, and a last name, and wherein second demographic field data is an address.

11. A system improving reliability in entity matching, comprising:
a processor; and
a memory storage device including instructions that when executed by the processor are operable to:
receive a request for a unique identifier of an entity associated with a medical record that includes a missing or an incomplete social security number;
provide indexed expanded demographic data that includes indexed credit header data of a credit agency that augments demographic information;
parse the request to determine demographic fields and demographic field data related to the entity;
perform a first look up operation in the indexed expanded demographic data for data of a first demographic field associated with the request;
receive, in response to the first look up operation, a first list of entities matching with the first demographic field data;
perform a second look up operation in the indexed expanded demographic data to determine a set of demographic attributes associated with each entity on the first list of entities, wherein the demographic attributes correspond to at least one other demographic field parsed from the request;
determine, based on a comparison between the demographic field data parsed from the request and the demographic attributes resulting from the second look up operation, a matching confidence for whether the entity corresponds to a given entity in the first list of entities; and
output the unique identifier when the matching confidence exceeds a confidence threshold.

12. The system of claim 11, further operable to mitigate a loss of third demographic field data of the demographic field data.

13. The system of claim 12, further operable to mitigate the loss of a social security number associated with the entity.

14. The system of claim 11, further operable to:
perform a third look up operation in the indexed expanded demographic data to determine a second list of entities, wherein the second list of entities are associated with a demographic attribute of the set of demographic attributes associated with the first list of entities; and
augment the first list of entities by incorporating the second list of entities and the set of demographic attributes associated with each entity of the second list of entities.

15. The system of claim 11, further operable to:
select, in response to the matching confidence satisfying the confidence threshold, a prior-assigned identifier that is associated with the given entity as the unique identifier for the entity; and
transmit the unique identifier to the requestor.

16. The system of claim 11, wherein the system is an entity matching system.

17. A computer readable storage device including computer readable instructions, which when executed by a processing unit is operative to:
receiving, at an entity matching system, a request for a unique identifier of an entity associated with a medical record that includes a missing or an incomplete social security number;
providing indexed expanded demographic data that includes indexed credit header data of a credit agency that augments demographic information;
parsing the request to determine demographic fields and demographic field data related to the entity;
performing a first look up operation in the indexed expanded demographic data for data of a first demographic field associated with the request;
receiving, in response to the first look up operation, a first list of entities matching the first demographic field data;
performing a second look up operation in the indexed expanded demographic data to determine a set of demographic attributes associated with each entity on the first list of entities, wherein the demographic attributes correspond to at least one other demographic field parsed from the request;
performing a third look up operation in the indexed expanded demographic data to determine a second list of entities, wherein the second list of entities are associated with a demographic attribute of the set of demographic attributes associated with the first list of entities;
augmenting the first list of entities by incorporating the second list of entities and the set of demographic attributes associated with each entity of the second list of entities;
determining, based on a comparison between the demographic field data parsed from the request and the resulting demographic attributes, a matching confidence for whether the entity corresponds to a given entity in the first list of entities; and
outputting the unique identifier when the matching confidence exceeds a confidence threshold.

18. The computer readable storage device of claim 17, further including computer readable instructions, which when executed by a processing unit is operative to:
selecting, in response to the matching confidence satisfying the confidence threshold, a prior-assigned identifier that is associated with the given entity as the unique identifier for the entity; and
transmitting the unique identifier to the requestor.

19. The computer readable storage device of claim 17, further including computer readable instructions, which when executed by a processing unit is operative to:
creating, in response to the matching confidence not satisfying the confidence threshold, a new identifier as the unique identifier for the entity.

* * * * *